US012789130B2

(12) United States Patent
Bignaud et al.

(10) Patent No.: US 12,789,130 B2
(45) Date of Patent: Nov. 10, 2026

(54) PROCESS AND APPARATUS FOR CAPTURE OF CO2

(71) Applicant: L'Air Liquide, Societe Anonyme pour l'Etude et l'Exploitation des Procedes Georges Claude, Paris (FR)

(72) Inventors: Charles Bignaud, Champigny-sur-Marne (FR); Vincent Lu, Houston, TX (US); Pierre-Philippe Guerif, Houston, TX (US); Mathieu Leclerc, Champigny-sur-Marne (FR)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 363 days.

(21) Appl. No.: 18/411,873

(22) Filed: Jan. 12, 2024

(65) Prior Publication Data

US 2025/0229214 A1 Jul. 17, 2025

(51) Int. Cl.
*B01D 53/047* (2006.01)
*B01D 53/26* (2006.01)

(52) U.S. Cl.
CPC ...... *B01D 53/047* (2013.01); *B01D 2257/504* (2013.01)

(58) Field of Classification Search
CPC .................. B01D 53/047; B01D 53/04; B01D 2257/504; B01D 53/002; B01D 53/005; B01D 53/02; B01D 53/261; F25J 3/0223; F25J 3/0252; F25J 3/0266; F25J 2205/40; F25J 2205/64; F25J 2205/66; F25J 2205/80; F25J 2220/82; F25J 2230/20; F25J 2270/04; Y02C 20/40
(Continued)

(56) References Cited

U.S. PATENT DOCUMENTS 5,897,686 A * 4/1999 Golden ................ B01D 53/047 95/123
2007/0232706 A1* 10/2007 Shah ....................... C01B 3/384 518/703
(Continued)

FOREIGN PATENT DOCUMENTS

CA 3127050 A1 * 7/2020 ......... C07C 29/1518
CA 3241165 A1 * 6/2023 ............... C01B 3/56

*Primary Examiner* — Frank M Lawrence, Jr.
(74) *Attorney, Agent, or Firm* — Justin K. Murray

(57) ABSTRACT

This invention relates to a process and apparatus for capturing $CO_2$ from gaseous mixtures containing hydrogen, water, and hydrocarbons. The system compresses the feed gas to 20-60 bara before dehydration in a temperature swing adsorption (TSA) unit. The dry gas undergoes separation to produce a $CO_2$-rich liquid and a residual gas.

This residual gas can be further processed in a pressure swing adsorption (PSA) unit to recover additional $CO_2$ and produce a $CO_2$-depleted off-gas. This off-gas—or a stream derived from it—can be utilized as a regeneration gas for the TSA adsorbent beds. After absorbing moisture during regeneration, the resulting wet gas is sent to a fuel-consuming unit, such as reformer burners or a fired heater. This integration eliminates the need to recycle wet regeneration gas, optimizing dryer size and improving overall plant efficiency.

9 Claims, 3 Drawing Sheets

(58) Field of Classification Search
USPC ................. 95/43, 51, 55, 96, 117, 123, 139; 96/121, 143, 144, 146; 62/617
See application file for complete search history.

(56) References Cited

U.S. PATENT DOCUMENTS

2011/0223100 A1* 9/2011 Monereau ................. C01B 3/56
62/617
2022/0233994 A1* 7/2022 Hernandez ........... B01D 53/002

* cited by examiner

PROCESS AND APPARATUS FOR CAPTURE OF CO2

FIELD OF THE INVENTION

The present invention relates to a process and an apparatus for capture of CO2.

BACKGROUND OF THE INVENTION

A carbon dioxide (CO2) capture unit using partial condensation and/or distillation is used to separate a gas from a hydrogen (H2) production unit comprising a pressure swing adsorption (PSA) unit producing a H2 rich stream is often combined with membrane separation. These membranes are used to separate the CO2 and H2 from the remaining molecules coming from the carbon dioxide capture unit. However, this membrane separation can be replaced by at least one pressure swing adsorption separation step.

It is known that the off-gas of a CO2 capture unit downstream a H2 production unit can be valorized as fuel in the burners of the H2 production unit.

The feed gas of the CO2 capture unit by partial condensation and/or distillation must be dried before being cooled in the low temperature section to avoid any risk of freezing. The drying process can be done by adsorption of the water on an adsorbent. This drying process by temperature swing adsorption is a cyclic process. The adsorbent switches from an adsorption step to remove water from the wet gas to a regeneration step to desorb water from the adsorbent. The regeneration step requires a hot and dry gas to regenerate the adsorbent.

The regeneration gas for the driers leaves the adsorbent wet. It must be recycled upstream the driers.

SUMMARY OF THE INVENTION

In certain embodiments, the invention proposes to use the CO2 capture off gas to regenerate the driers, since this gas is recycled to a fuel-consuming unit as a fuel, for example to the burners of the H2 production unit. The fuel-consuming unit, for example burners or a fired heater, can handle wet gas, and thus the water removed by the TSA leaves the process with the flue gas of the burners.

Recycling the wet regeneration gas at TSA inlet implies significantly increasing the size of the driers, except if a gas is already recycled upstream the TSA. The low pressure $CO_2$ rich gas from the $CO_2$ PSA is recycled at the inlet of the $CO_2$ capture unit. This gas can be used as a regeneration gas but it implies increasing the tail gas pressure of the $CO_2$ PSA, thus the $CO_2$ PSA performances are degraded.

According to an object of the invention, there is provided A separation process for a gaseous mixture containing CO2, hydrogen, water and at least one component chosen in the list: methane, carbon monoxide with the following steps:

i) Compression of the gaseous mixture to a first pressure between 20 to 60 bara.

ii) Drying the compressed gas mixture with a temperature swing adsorption unit comprising at least two adsorbent beds iii) Separation of the dry and compressed gaseous mixture in a separation unit by at least one of the following steps: partial condensation, distillation, washing and solidification to produce at least two streams, being a liquid enriched in CO2 and depleted in at least one of methane and hydrogen and carbon monoxide as compared with the gaseous mixture and a first residual gas depleted in CO2 and enriched in at least one of methane and hydrogen and carbon monoxide as compared with the gaseous mixture.

iv) Separation of the first residual gas depleted in CO2 from iii) by at least one pressure swing adsorption unit in order to produce at least one gas richer in CO2 than the first residual gas and at least one gas depleted in CO2 and enriched in at least one of methane and hydrogen and carbon monoxide as compared to the first residual gas.

v) Regeneration of one of said adsorbent beds using a regeneration gas thereby producing a regeneration gas containing water wherein the regeneration gas is chosen from the list: at least a part of at least one gas depleted in CO2 as compared to the first residual gas from step iv) and a gas containing at least one of methane and carbon monoxide formed by separating the at least one gas depleted in CO2 and vi) Sending the regeneration gas containing water as a fuel to a fuel-consuming unit.

According to other optional features:

the gaseous mixture contains a component chosen in the list: helium, nitrogen, argon;

the regeneration gas is produced by separating the at least one gas depleted in CO2 and enriched in at least one of methane and hydrogen and carbon monoxide as compared to the first residual gas;

the at least one gas depleted in CO2 and enriched in at least one of methane and hydrogen and carbon monoxide as compared to the first residual gas contains hydrogen and is separated as a feed gas in at least a pressure adsorption unit to produce a gas at a first pressure depleted in hydrogen as compared to the feed gas and a gas at a higher pressure than the first pressure enriched in hydrogen as compared with the feed gas, the gas at the first pressure forming the regeneration gas;

the at least one gas depleted in CO2 and enriched in at least one of methane and hydrogen and carbon monoxide as compared to the first residual gas contains hydrogen and is separated as a feed gas in at least a membrane separation unit to produce a gas at a first pressure depleted in hydrogen as compared to the feed gas and a gas at a lower pressure than the first pressure which is enriched in hydrogen as compared with the feed gas, the gas at the first pressure forming the regeneration gas the regeneration gas used to regenerate the temperature swing adsorption unit is heated to a temperature between 120 to 250° C.;

the dried and compressed gaseous mixture is compressed again between the temperature swing adsorption unit and the separation unit;

the regeneration gas containing water is sent to burners producing heat for a reformer producing the gas containing CO2, hydrogen, water and at least one component chosen in the list: methane, carbon monoxide;

the regeneration gas containing water is sent to a fired heater producing heat for a reformer producing the gas containing CO2, hydrogen, water and at least one component chosen in the list: methane, carbon monoxide;

a gas containing CO2, hydrogen, water and at least one component chosen in the list: methane, carbon monoxide is separated by at least one of permeation and adsorption to form a hydrogen enriched gas and the gaseous mixture containing $CO_2$, water and at least one component chosen in the list: methane, carbon monoxide;

the regeneration gas contains at least 15% mol methane.

According to another object of the invention, there is provided an apparatus for separation of a gaseous mixture containing $CO_2$, hydrogen, water and at least one component chosen in the list: methane, carbon monoxide including a compressor for compressing the gaseous mixture to a first pressure between 20 to 60 bara, a temperature swing adsorption unit for drying the compressed gas mixture comprising at least two adsorbent beds, a separation unit for separation of the dry and compressed gaseous mixture by at least one of the following techniques: partial condensation, distillation, washing and solidification to produce at least two streams, being a rich $CO_2$ liquid enriched in $CO_2$ and depleted in at least one of methane and hydrogen and carbon monoxide as compared with the gaseous mixture and a first residual gas depleted in $CO_2$ and enriched in at least one of methane and hydrogen and carbon monoxide as compared with the gaseous mixture, a pressure swing adsorption unit for separation of the first residual gas depleted in $CO_2$ from iii) by at least one pressure swing adsorption unit in order to produce at least one gas richer in $CO_2$ than the first residual first residual gas and at least one gas depleted in $CO_2$ and enriched in at least one of methane and hydrogen and carbon monoxide as compared to the first residual gas, a conduit for sending to one of said adsorbent beds a regeneration gas thereby producing a regeneration gas containing water wherein the regeneration gas is chosen from the list: at least a part of the at least one gas depleted in $CO_2$ as compared to the first residual gas and a gas containing at least one of methane and carbon monoxide formed by separating the at least one gas depleted in $CO_2$ and a conduit for sending the regeneration gas containing water as a fuel to a fuel-consuming unit.

In certain embodiments, the invention may include use of the off gas of the pressure swing adsorption unit or a gas derived therefrom as a regeneration gas for the driers upstream the cryogenic section. The invention may have at least some of the following steps:

1. Compress the feed gas of the $CO_2$ capture unit by a cryogenic process.
2. Dry the compressed feed gas in a temperature swing adsorption unit.
3. Cooled the dried and compressed gas in order to obtain a two phase flow.
4. Separate the two phase flow to produce a $CO_2$ enriched liquid and a $CO_2$ depleted gas.
5. Heat and recycle the $CO_2$ depleted gas to at least a pressure swing adsorption unit to generate at least a $CO_2$ depleted off gas as compared with the $CO_2$ depleted gas.
6. Use at least the $CO_2$ depleted off gas from step 5 or a gas derived therefrom to regenerate the temperature swing adsorption unit.
7. Optionally recycling the wet regeneration gas to a fuel system outside of the $CO_2$ capture unit battery limit.

BRIEF DESCRIPTION OF THE DRAWINGS

Other features and advantages of the invention will become further apparent via, on the one hand, the following description and, on the other hand, several exemplary embodiments given by way of non-limiting indication and with reference to the attached schematic drawings, in which.

DETAILED DESCRIPTION OF THE INVENTION

Figure 1:
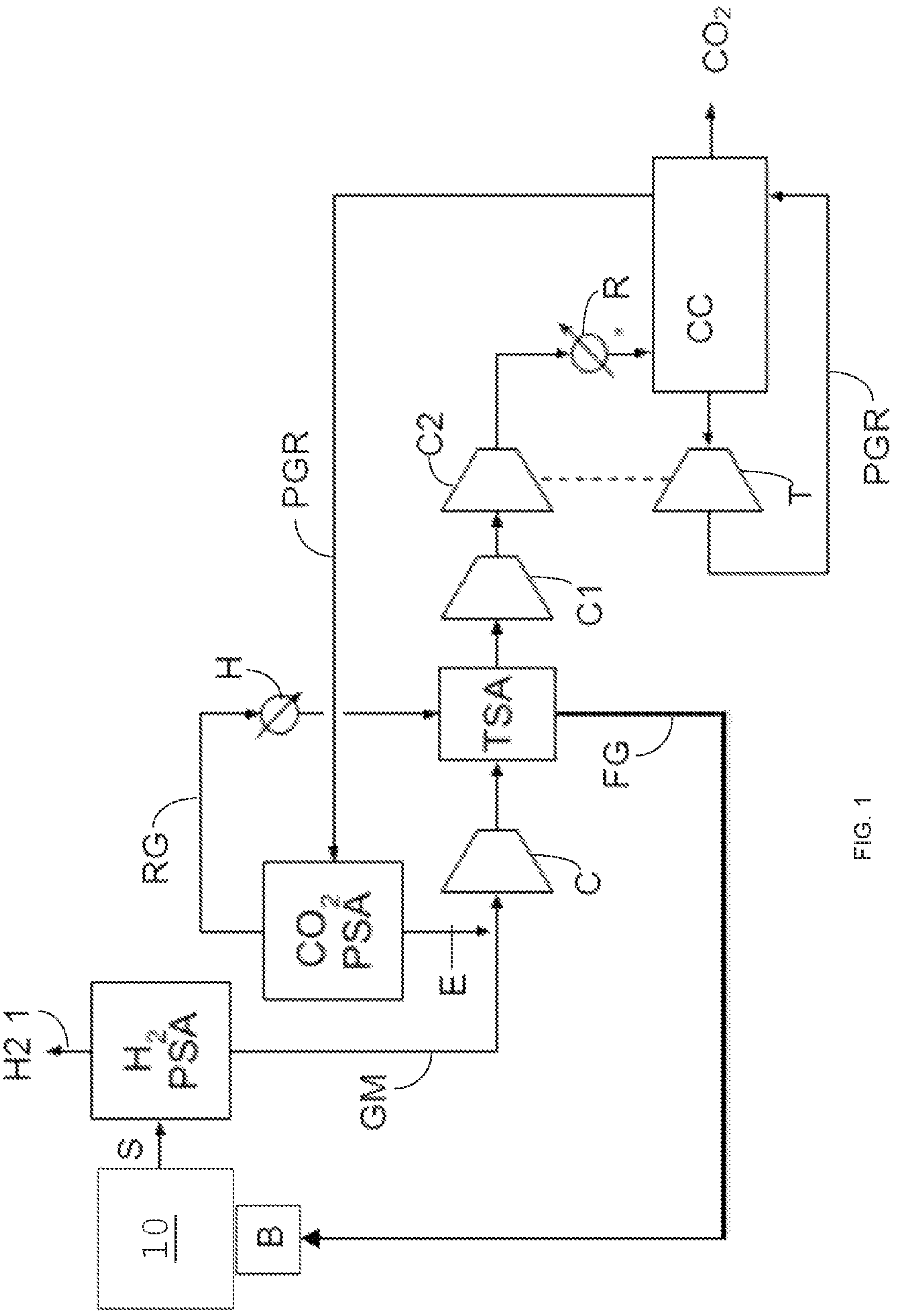
FIG. 1 provides a schematic diagram of a first embodiment of the present invention.

In FIG. 1, a reformer 10, which may be a steam methane reformer or an autothermal reformer, produces a gas S containing $CO_2$, hydrogen, water and at least one component chosen in the list: methane, carbon monoxide. The gas may also contain helium and/or nitrogen and/or argon.

The gas S is separated by permeation and/or adsorption, in this case by a single pressure swing adsorption unit $H_2$ PSA to produce a gas $H_2$ 1 richer in hydrogen than gas S, which may be a hydrogen product and a gaseous mixture GM depleted in hydrogen and enriched in carbon dioxide, still containing water and methane and/or carbon monoxide.

The gaseous mixture GM is compressed in a compressor C and then dried in a temperature swing adsorption unit TSA. The gaseous mixture GM may contain for example 50% $CO_2$, 30% hydrogen and 10% methane all percentages being molar.

The dried gaseous mixture is preferably further compressed in compressors C1, C2 to a pressure between 20 and 60 bara, cooled by cooler R and separated in a separation unit CC at a temperature below −30° C. by partial condensation and/or distillation and/or washing and/or solidification. The separation unit produces as a product a fluid enriched in carbon dioxide and depleted in methane and/or carbon monoxide with respect to the gaseous mixture GM, which may also contain nitrogen. The separation unit also produces a first residual gas PGR at a pressure substantially equal to that of the gaseous mixture GM depleted in carbon dioxide and enriched in methane and/or hydrogen and/or carbon monoxide with respect to the gaseous mixture GM, which may also contain nitrogen. The first residual gas PGR may contain 19% $CO_2$, 50% hydrogen and 20% methane. The first residual gas PGR depleted in carbon dioxide is expanded in a turbine T to a pressure between 6 and 30 bara, and sent to a $CO_2$ PSA to be separated forming a gas E richer in carbon dioxide than the gas PGR and a gas RG depleted in carbon dioxide with respect to the gas PGR. Optionally the first residual gas PGR may provide refrigeration to the separation unit CC down stream of the turbine T and upstream of the $CO_2$ PSA. The gas RG depleted in carbon dioxide contains methane and/or carbon monoxide and/or hydrogen in addition to remaining carbon dioxide and is used as a regeneration gas to regenerate the temperature swing adsorption (TSA) unit. Once the regeneration has been performed, the regeneration gas contains water adsorbed in one of the at least two adsorption beds of the TSA unit and can be sent as a fuel FG to a fuel consuming unit, for example a fuel system outside of the $CO_2$ capture unit battery limit. In particular, the regeneration gas can be sent to burners B associated with the reformer 10 and/or a fired heater B associated with the reformer R. The regeneration gas may contain at least 15% mol methane.

The gas richer in carbon dioxide produced by the $CO_2$ PSA is mixed with the gaseous mixture upstream of compressor C.

The regeneration gas RG contains water, 1% $CO_2$, 70% hydrogen and 20% methane, all percentages being molar.

Figure 2:
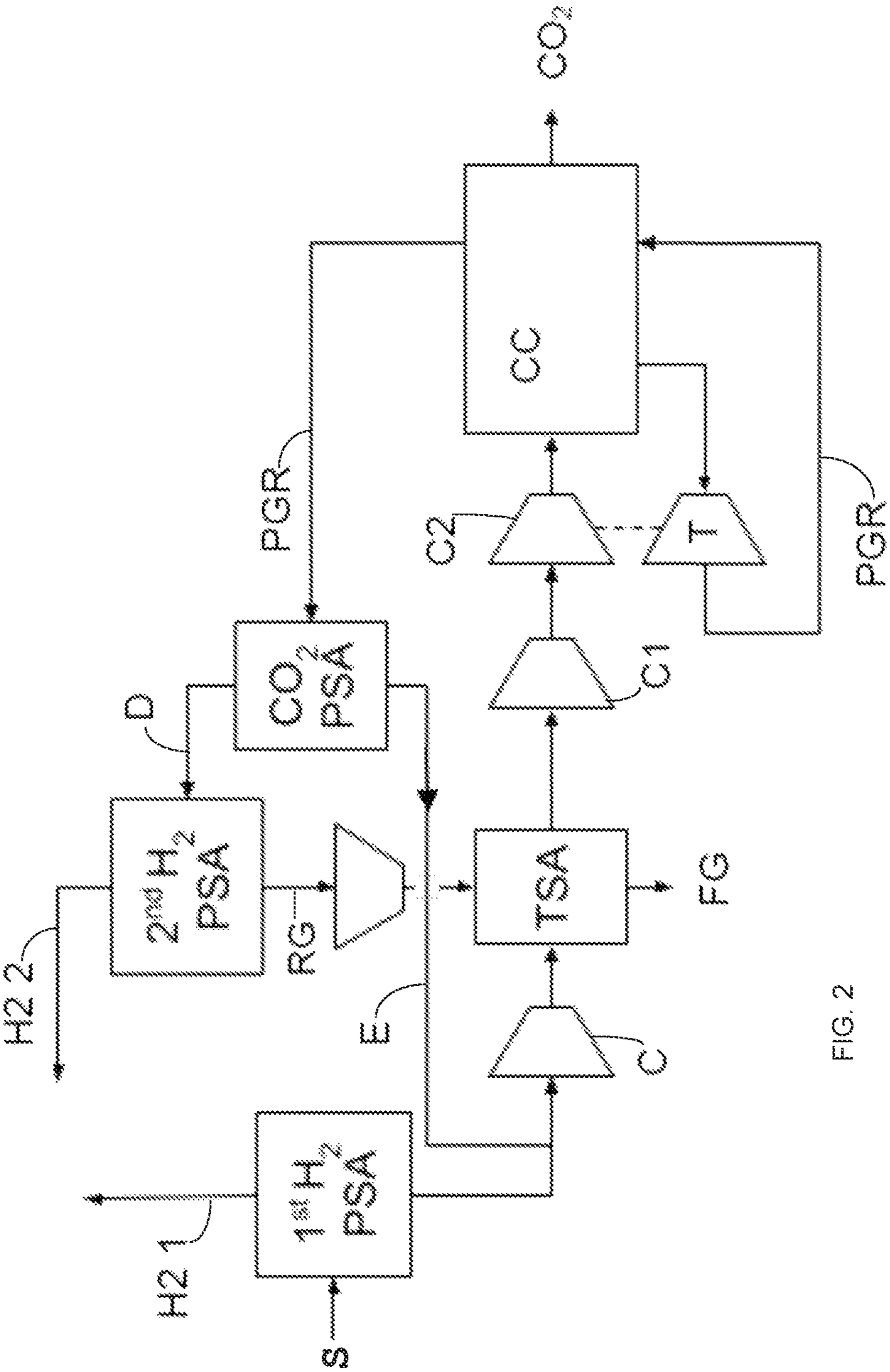
FIG. 2 provides a schematic diagram of a second embodiment of the present invention.

The process of FIG. 2 differs from that of FIG. 1 in that the gas D depleted in carbon dioxide with respect to the gas PGR is not sent directly to the TSA as a regeneration gas but is separated in a second pressure swing adsorption unit 2*nd* H2 PSA. The feed gas D feeding the second PSA is depleted in carbon dioxide but contains methane and/or hydrogen and/or carbon monoxide in addition to remaining carbon dioxide. It is separated by the second PSA to form a hydrogen rich gas H2 2 and a regeneration gas RG richer in methane and/or carbon monoxide and depleted in hydrogen as compared to the gas D.

The regeneration gas of FIG. 2 is of course less rich in hydrogen than that of FIG. 1, but the system FIG. 2 allows additional hydrogen product to be produced.

Figure 3:
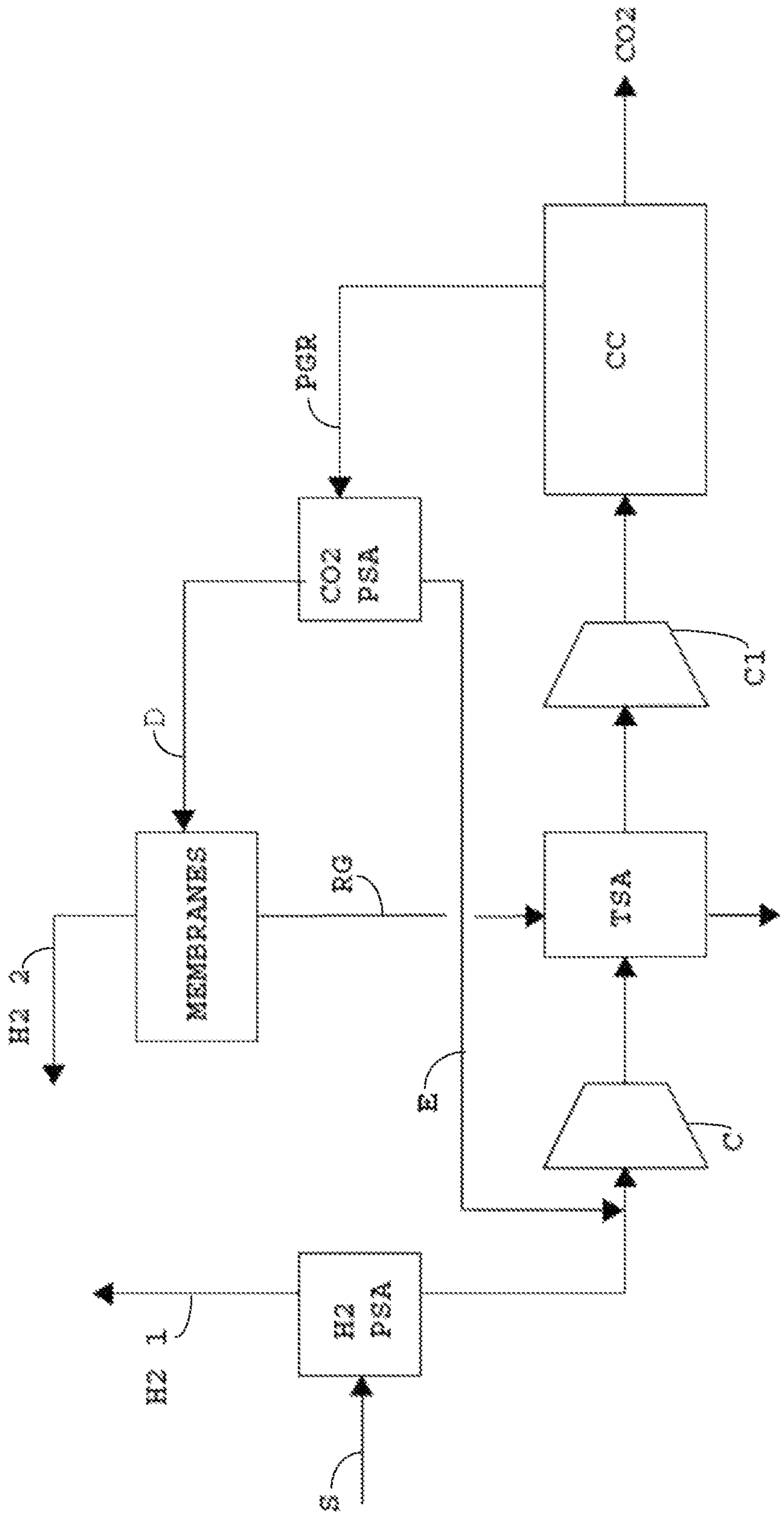
FIG. 3 provides a schematic diagram of a third embodiment of the present invention.

FIG. 3 differs from FIG. 2 in that the second H2 PSA is replaced by a membrane separation unit. Feed gas D from the CO2 PSA is separated by the membrane separation unit to form a hydrogen stream H2 2 at a lower pressure than the stream RG produced by the membrane separation unit, which is richer in methane and/or carbon monoxide but depleted in hydrogen with respect to gas D and is used as a regeneration gas for the TSA unit, without requiring any compression step upstream of the TSA.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A separation process for a gaseous mixture containing CO2, hydrogen, water and at least one component chosen in the list: methane, carbon monoxide with the following steps:

ii) compressing the gaseous mixture to a first pressure between 20 to 60 bara;

iii) drying the compressed gas mixture with a temperature swing adsorption unit comprising at least two adsorbent beds;

iv) separating the dry and compressed gaseous mixture in a separation unit by at least one of the following steps: partial condensation, distillation, washing and solidification to produce at least two streams, being a liquid enriched in CO2 and depleted in at least one of methane and hydrogen and carbon monoxide as compared with the gaseous mixture and a first residual gas depleted in CO2 and enriched in at least one of methane and hydrogen and carbon monoxide as compared with the gaseous mixture;

v) separating the first residual gas depleted in CO2 from iii) by at least one pressure swing adsorption unit in order to produce at least one gas richer in CO2 than the first residual gas and at least one gas depleted in CO2 and enriched in at least one of methane and hydrogen and carbon monoxide as compared to the first residual gas;

vi) regenerating one of said adsorbent beds using a regeneration gas thereby producing a regeneration gas containing water wherein the regeneration gas is chosen from the list: at least a part of at least one gas depleted in CO2 as compared to the first residual gas from step iv) and a gas containing at least one of methane and carbon monoxide formed by separating the at least one gas depleted in CO2; and vii) sending the regeneration gas containing water as a fuel to a fuel-consuming unit, wherein the regeneration gas is produced by separating the at least one gas depleted in CO2 and enriched in at least one of methane and hydrogen and carbon monoxide as compared to the first residual gas, wherein the at least one gas depleted in CO2 and enriched in at least one of methane and hydrogen and carbon monoxide as compared to the first residual gas contains hydrogen and is separated as a feed gas in at least a pressure swing adsorption unit to produce a gas at a first pressure depleted in hydrogen as compared to the feed gas and a gas at a higher pressure than the first pressure enriched in hydrogen as compared with the feed gas, the gas at the first pressure forming the regeneration gas.

2. The process as claimed in claim 1, wherein the gaseous mixture contains a component chosen in the list: helium, nitrogen, argon.

3. The process as claimed in claim 1, wherein the regeneration gas used to regenerate the temperature swing adsorption unit is heated to a temperature between 120 to 250° C.

4. The process as claimed in claim 1, wherein the dried and compressed gaseous mixture is compressed again between the temperature swing adsorption unit and the separation unit.

5. The process as claimed in claim 1, wherein the regeneration gas containing water is sent to burners producing heat for a reformer producing the gas containing CO2, hydrogen, water and at least one component chosen in the list: methane, carbon monoxide.

6. The process as claimed in claim 1, wherein the regeneration gas containing water is sent to a fired heater producing heat for a reformer producing the gas containing CO2, hydrogen, water and at least one component chosen in the list: methane, carbon monoxide.

7. The process as claimed in claim 1, wherein a gas containing CO2, hydrogen, water and at least one component chosen in the list: methane, carbon monoxide is separated by at least one of permeation and adsorption to form a hydrogen enriched gas and the gaseous mixture containing $CO_2$, water and at least one component chosen in the list: methane, carbon monoxide.

8. The process as claimed in claim 1, wherein the regeneration gas contains at least 15% mol methane.

9. An apparatus for separation of a gaseous mixture containing $CO_2$, hydrogen, water and at least one component chosen in the list: methane, carbon monoxide, the apparatus comprising:

a compressor configured to compress the gaseous mixture to a first pressure between 20 to 60 bara;

a temperature swing adsorption unit (TSA) in fluid communication with the compressor and configured to dry the compressed gas mixture, wherein the TSA comprises at least two adsorbent beds;

a separation unit in fluid communication with the TSA and configured to separate the dry and compressed gaseous mixture by distillation, wherein the separation unit is further configured to produce at least two streams, being a liquid enriched in $CO_2$ and depleted in at least one of methane and hydrogen and carbon monoxide as compared with the gaseous mixture and a first residual gas depleted in $CO_2$ and enriched in at least one of methane and hydrogen and carbon monoxide as compared with the gaseous mixture;

a first pressure swing adsorption unit (PSA) configured to separate the first residual gas depleted in $CO_2$ from the separation unit and produce at least one gas richer in $CO_2$ than the first residual gas and at least one gas depleted in $CO_2$ and enriched in at least one of methane and hydrogen and carbon monoxide as compared to the first residual gas;

a second pressure swing adsorption unit configured to receive the at least one gas depleted in $CO_2$ from the first PSA as a feed gas and produce a hydrogen-enriched gas at a high pressure and a hydrogen-depleted gas at a lower pressure;

a first conduit configured to send one of said adsorbent beds a regeneration gas comprising the hydrogen-depleted gas from the second pressure swing adsorption unit; and a second conduit configured to send the regeneration gas containing water as a fuel to a fuel-consuming unit.

* * * * *